May 19, 1931.   C. S. KELLEY   1,805,668
PACKING RING
Filed May 1, 1926
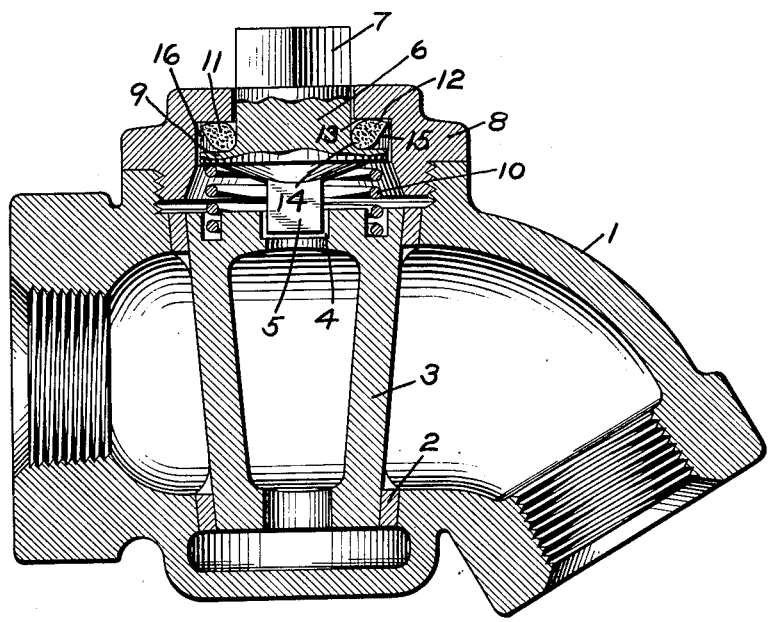
INVENTOR
CECIL S. KELLEY
BY *Wm. M. Cady*
ATTORNEY Patented May 19, 1931

1,805,668

UNITED STATES PATENT OFFICE

CECIL S. KELLEY, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

PACKING RING

Application filed May 1, 1926. Serial No. 106,010.

This invention relates to packing rings, and more particularly to a packing ring adapted for use in connection with a plug valve.

Where the usual packing ring, rectangular in cross section, is employed between a fixed and a moving part, if the moving part should be moved out of alinement with the packing ring, the ring is liable to be compressed more on one side than the other or become distorted to such an extent as to permit leakage past the ring.

The principal object of my invention is to provide an improved packing ring capable of adjusting itself to maintain a leak-tight joint, against any variation in the alinement of the parts, between which the ring may be interposed.

In the drawing, the single figure is a central sectional view of a plug valve device, showing my improved packing ring applied thereto.

For the purpose of illustrating one application of my improvement, I have shown an angle cock comprising a valve body 1 having a tapered bore in which is fitted a tapered bushing 2 providing a seat for a tapered plug valve 3.

The particular valve device shown is similar to that covered in my prior pending application, Serial No. 32,030, filed May 22, 1925, and accordingly is constructed so that the larger end of the plug valve is uppermost. The upper end of the valve is provided with a squared recess 4 for receiving a square key portion 5 of a valve operating member 6. The operating member 6 is provided with a square key section 7 which extends out through an opening in a cap nut 8, said nut having screw-threaded engagement in the valve body 1. An annular flange 9 is interposed between the key portions 5 and 7, and a spring 10 is interposed between the upper portion of the valve 3 and said flange.

A washer 11, constructed in accordance with my invention, is interposed between the flange 9 and the inner adjacent face of the cap nut 8.

In contour, the packing ring has a curved face 12, adapted to engage at a line of contact with the face 13 of the nut 8 and merging with a curved face 14 which engages a correspondingly curved fillet of the member 6. The curved face 14 merges into a face 15 which joins the face 12 at a point.

The gasket 11 is preferably made of a rubber composition, and if there is any cocking of the member 6, so that the flange 9 is nearer the face 13 at one side than at the other, the material of the packing ring will yield so as to permit the fluid under pressure acting in chamber 16, as supplied from the conduit of the valve body, to force the packing ring to adjust itself to correspond. That is to say, when the space between the face 13 and the flange 9 is increased, the line of contact of the packing ring with the face 13 will move inwardly and when the space is decreased, the line of contact will be displaced outwardly. Under all conditions, however, there will be a leak-tight contact at 14 and also at the line where the curved face 12 happens to engage the face 13.

Having now described my invention, what I claim as new and desire to secure by Letters Patent, is:—

1. The combination with a fixed member having a flat contact face and a movable member spaced from the fixed member, of an elongated packing ring disposed in the space between said members having a long diameter and a short diameter and having a curved face in engagement with said flat face and terminating in the long diameter of the ring, whereby a sliding rolling movement of the curved face on the flat face is effected as the movable member recedes from or approaches the fixed member.

2. The combination with a fixed member having a flat contact face and a movable member spaced from the fixed member, of a flexible packing ring disposed in the space between said members and having an elongated cross section with a curved contour line in engagement with said flat face and terminating in the long diameter of the section, the long diameter of the section being inclined to the flat face.

In testimony whereof I have hereunto set my hand.

CECIL S. KELLEY.